Figure 1A:
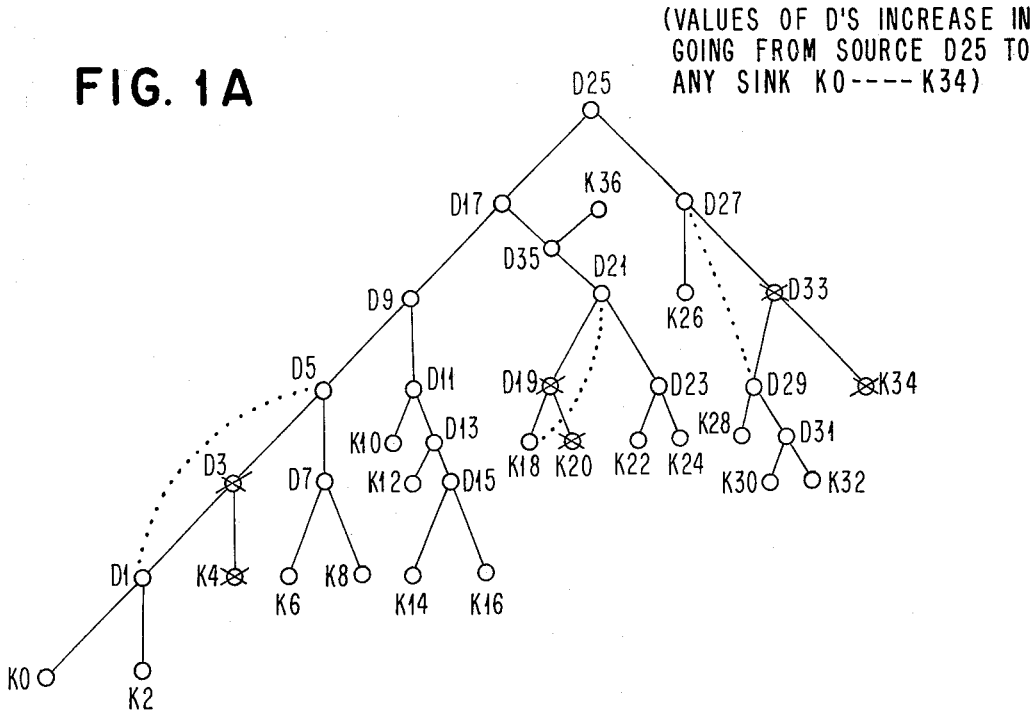
Figure 1B:
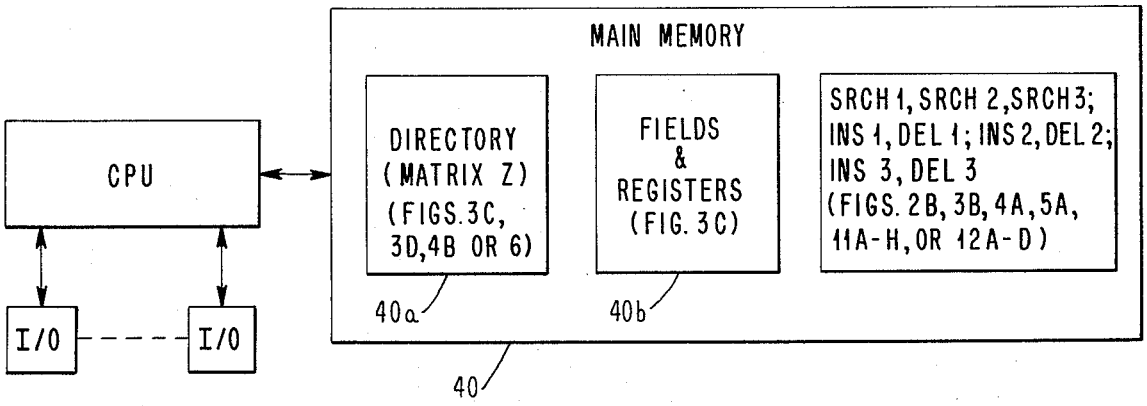
Figure 0:
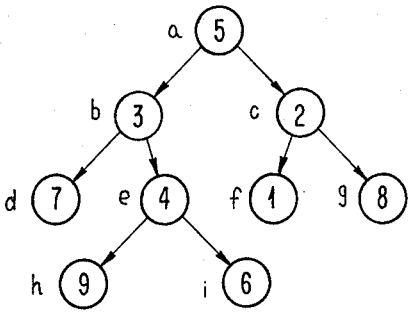
Figure 2C:
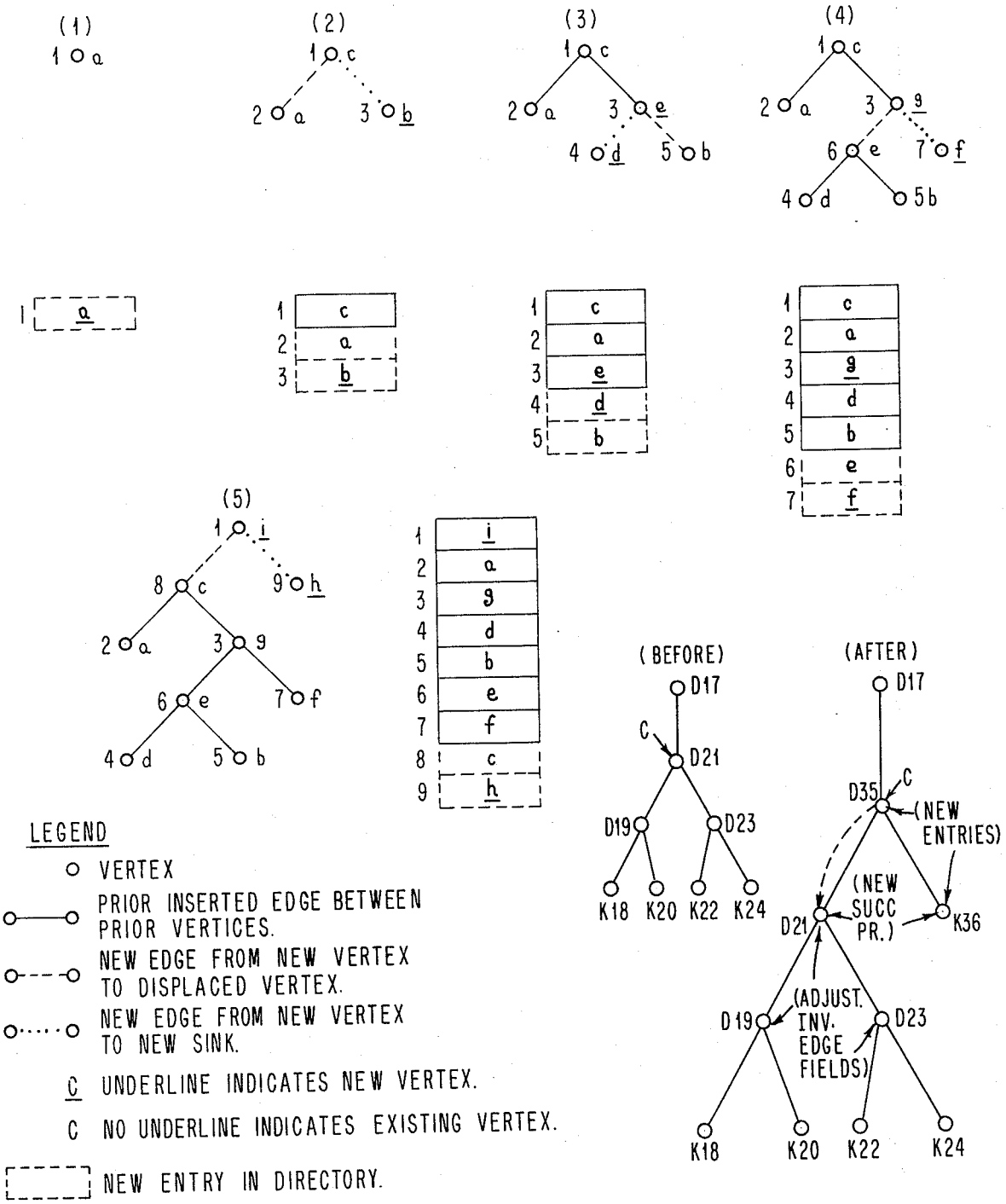
Figure 2B:
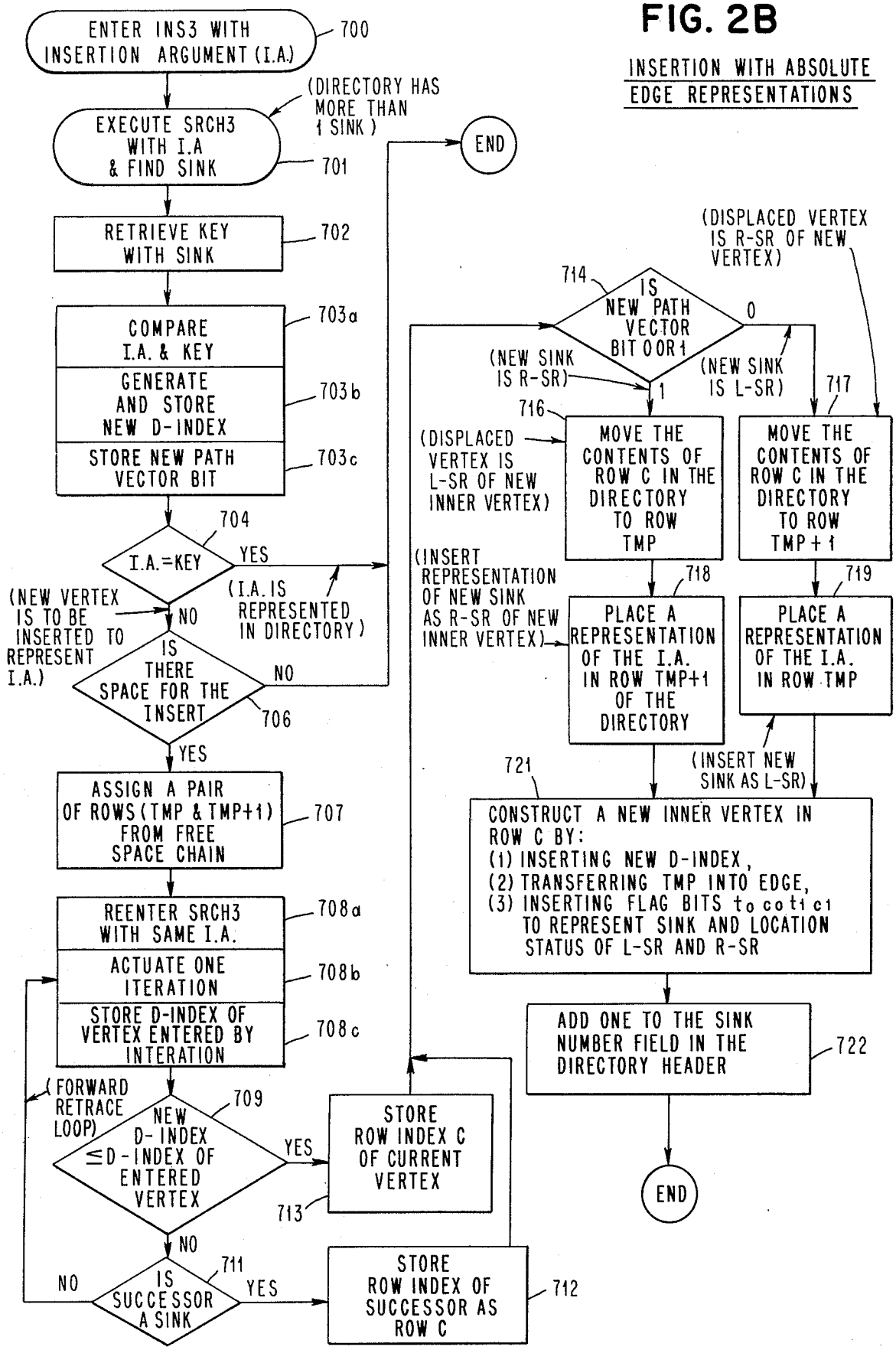
Figure 3B:
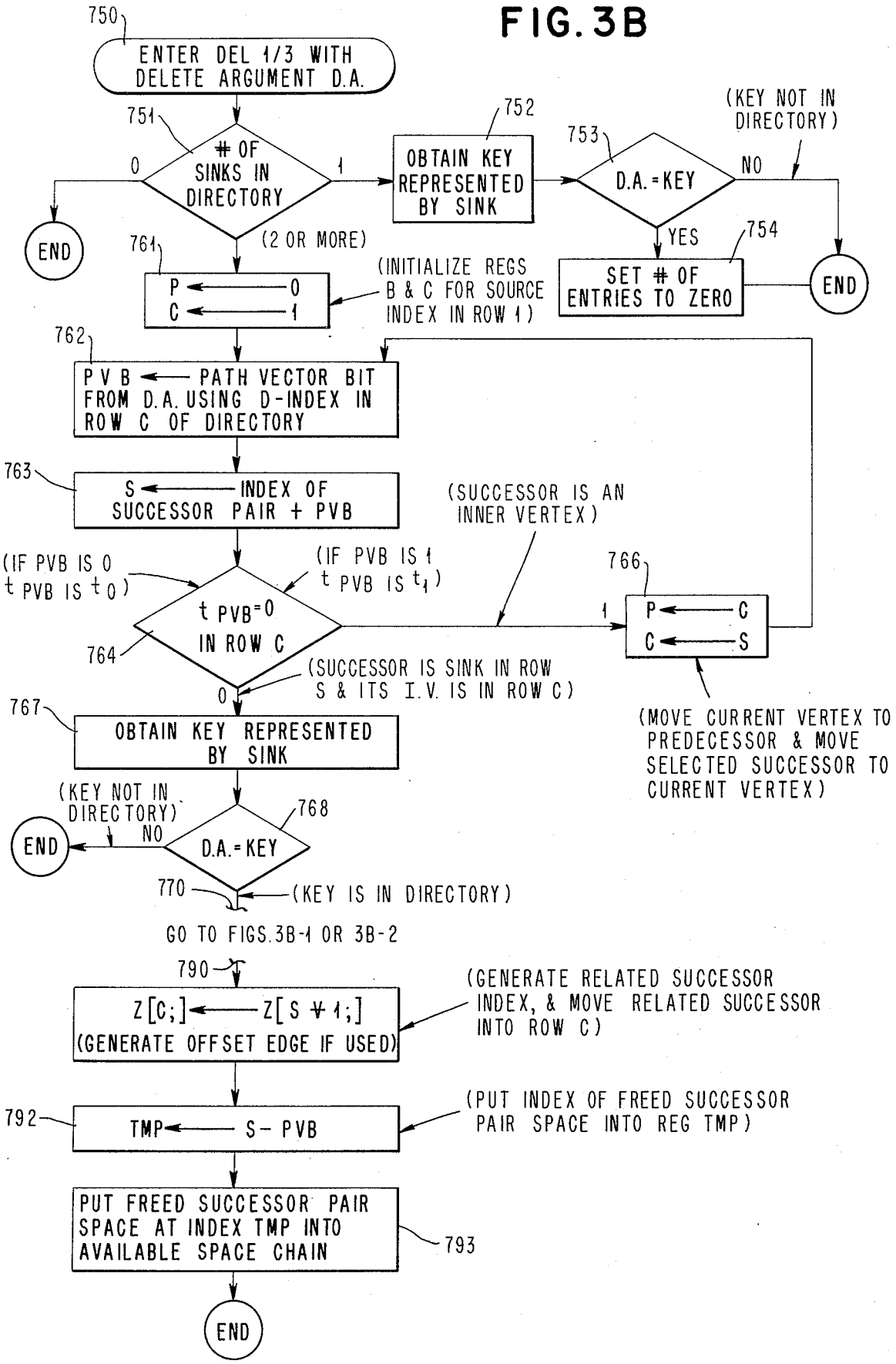
Figures 1, 3B:
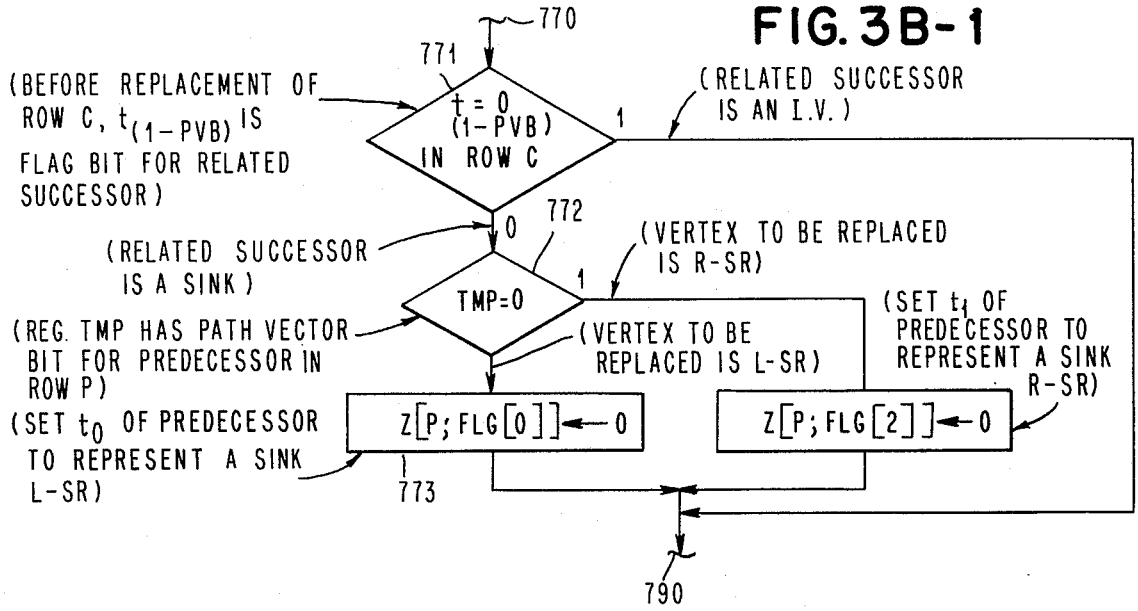
Figures 2, 3B:
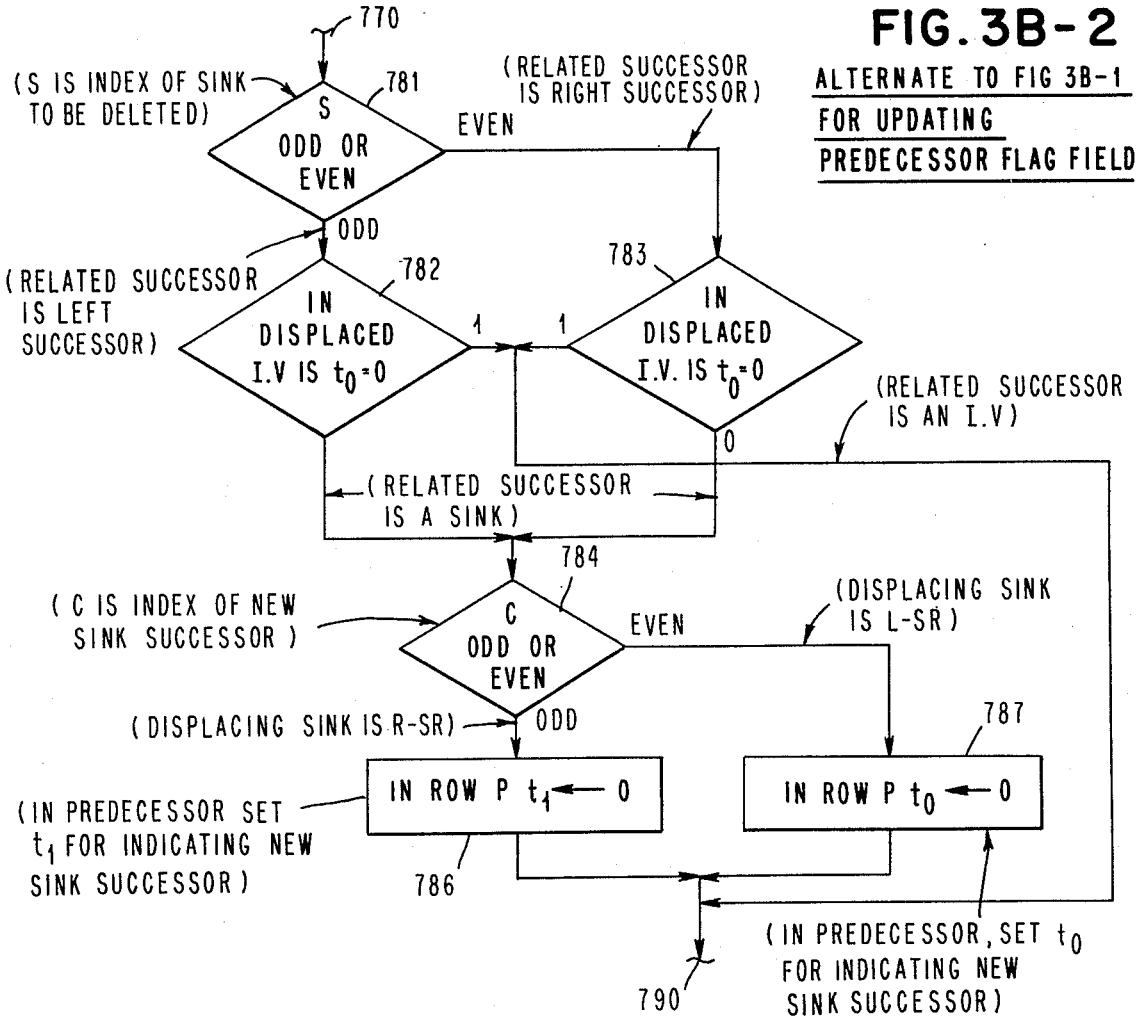
Figure 3D:
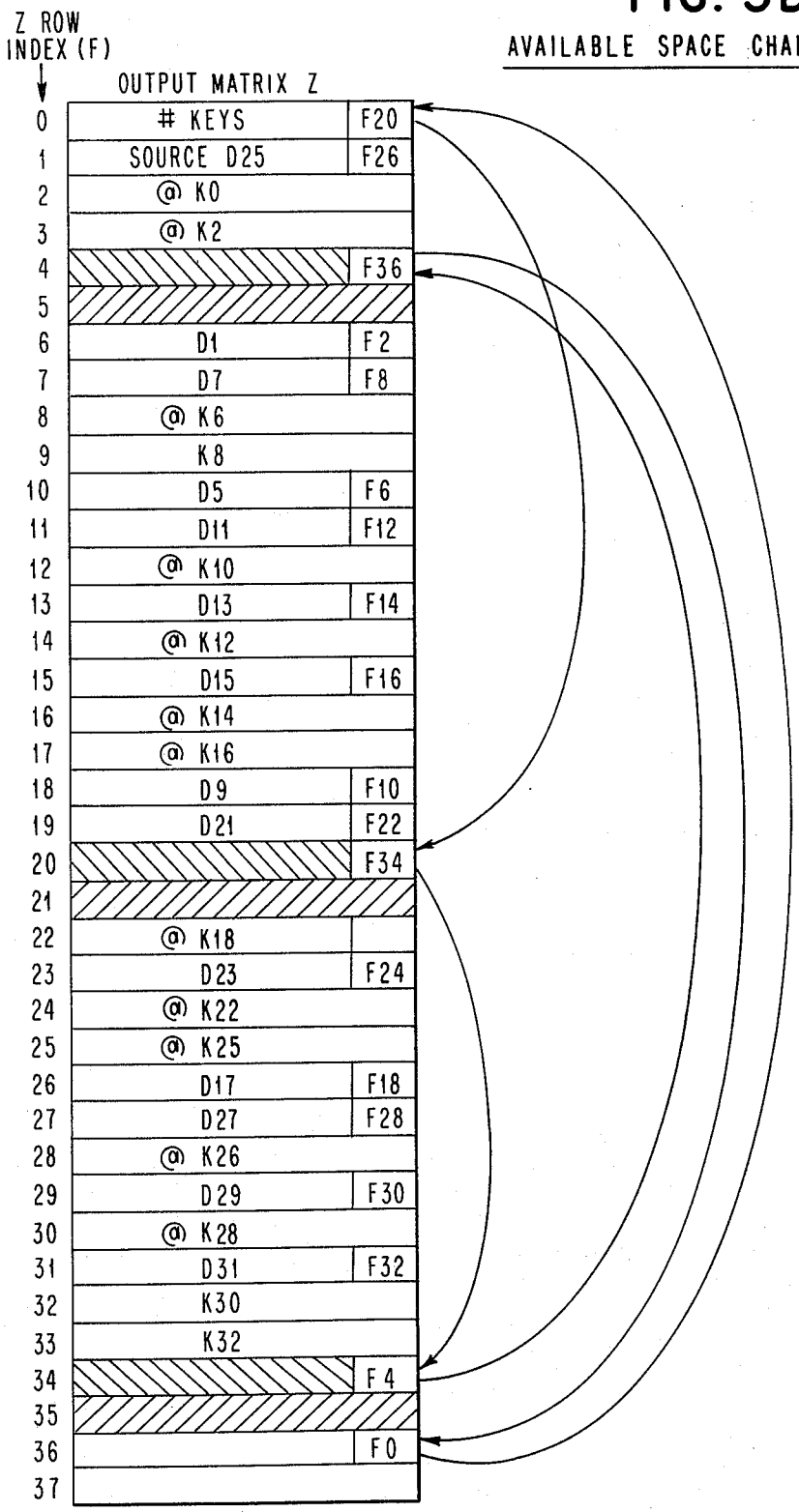
Figures 5A, 5B, 6:
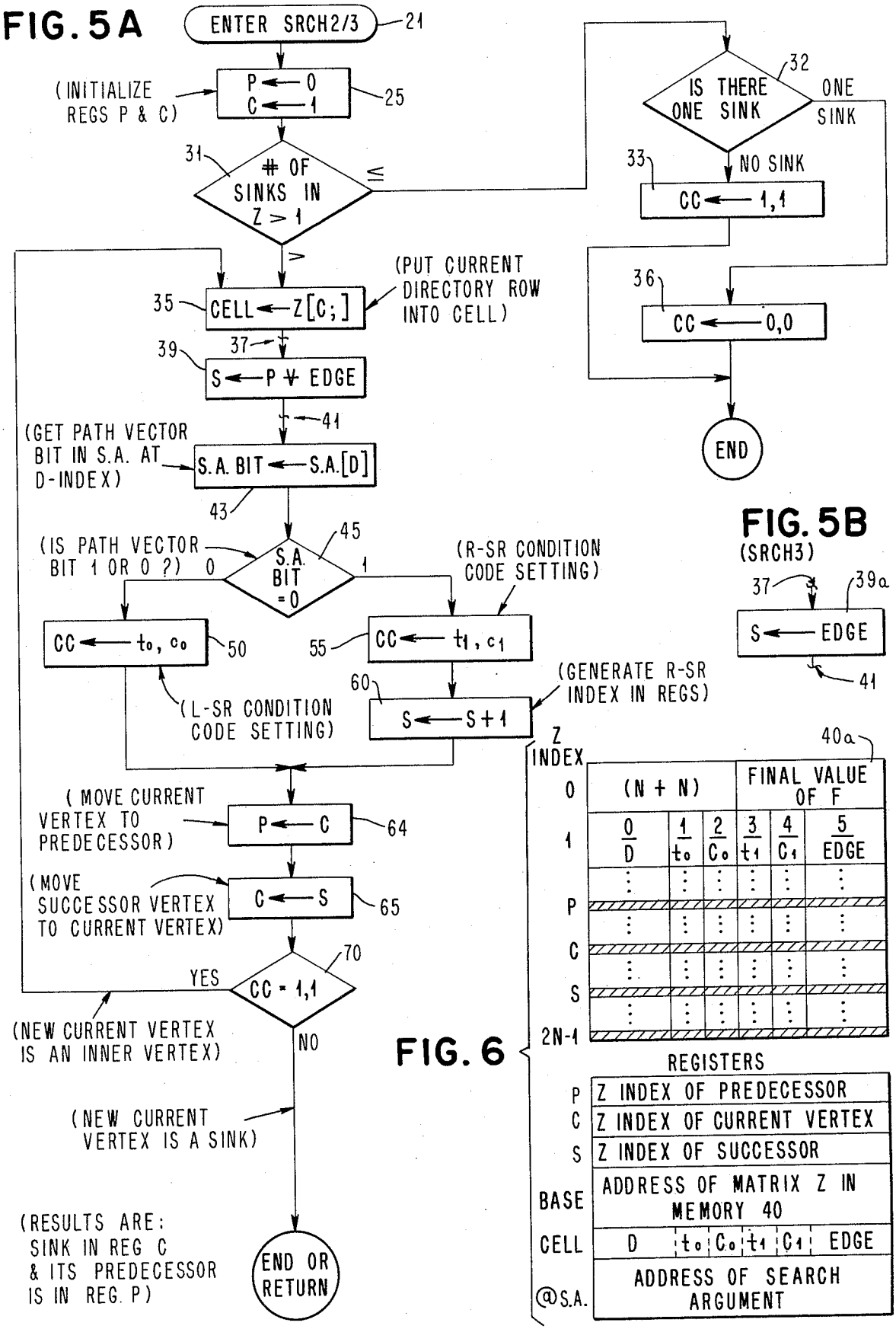
Figure 5C:
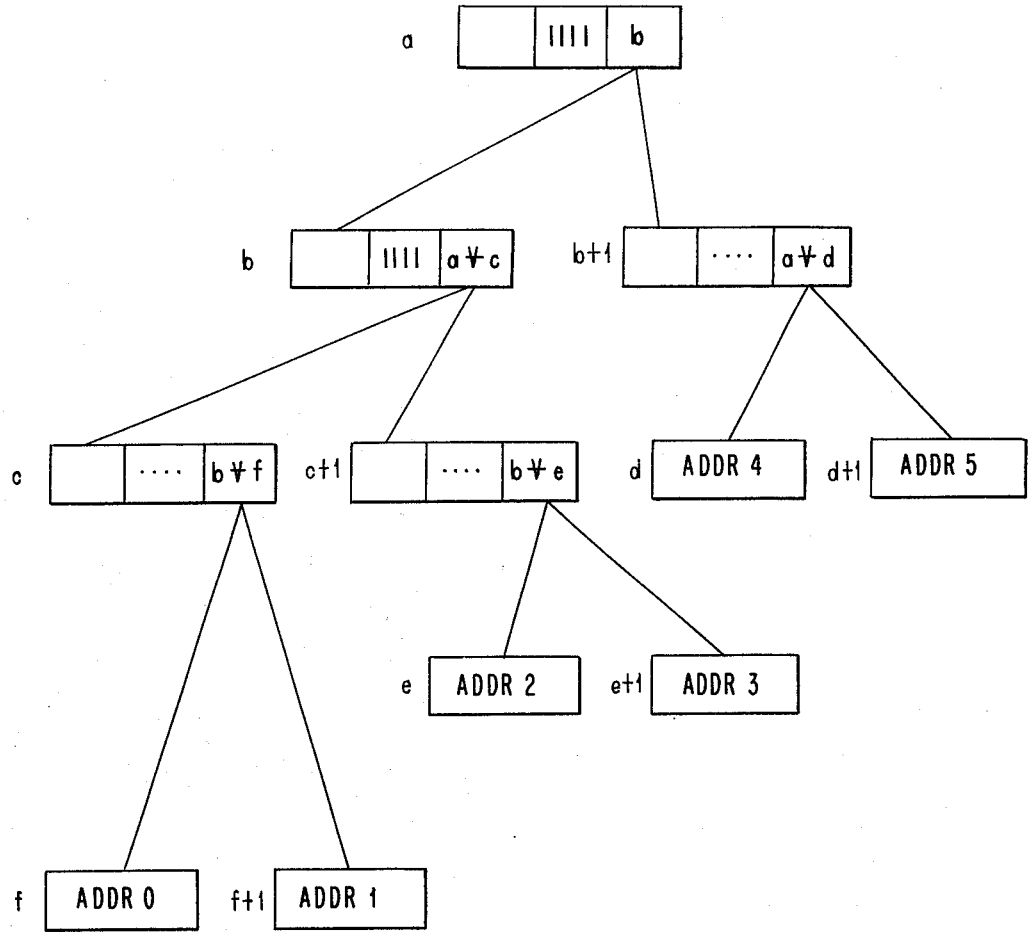
Figure 5D:
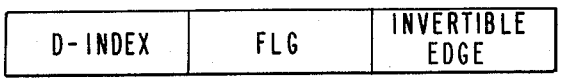
Figure 7:
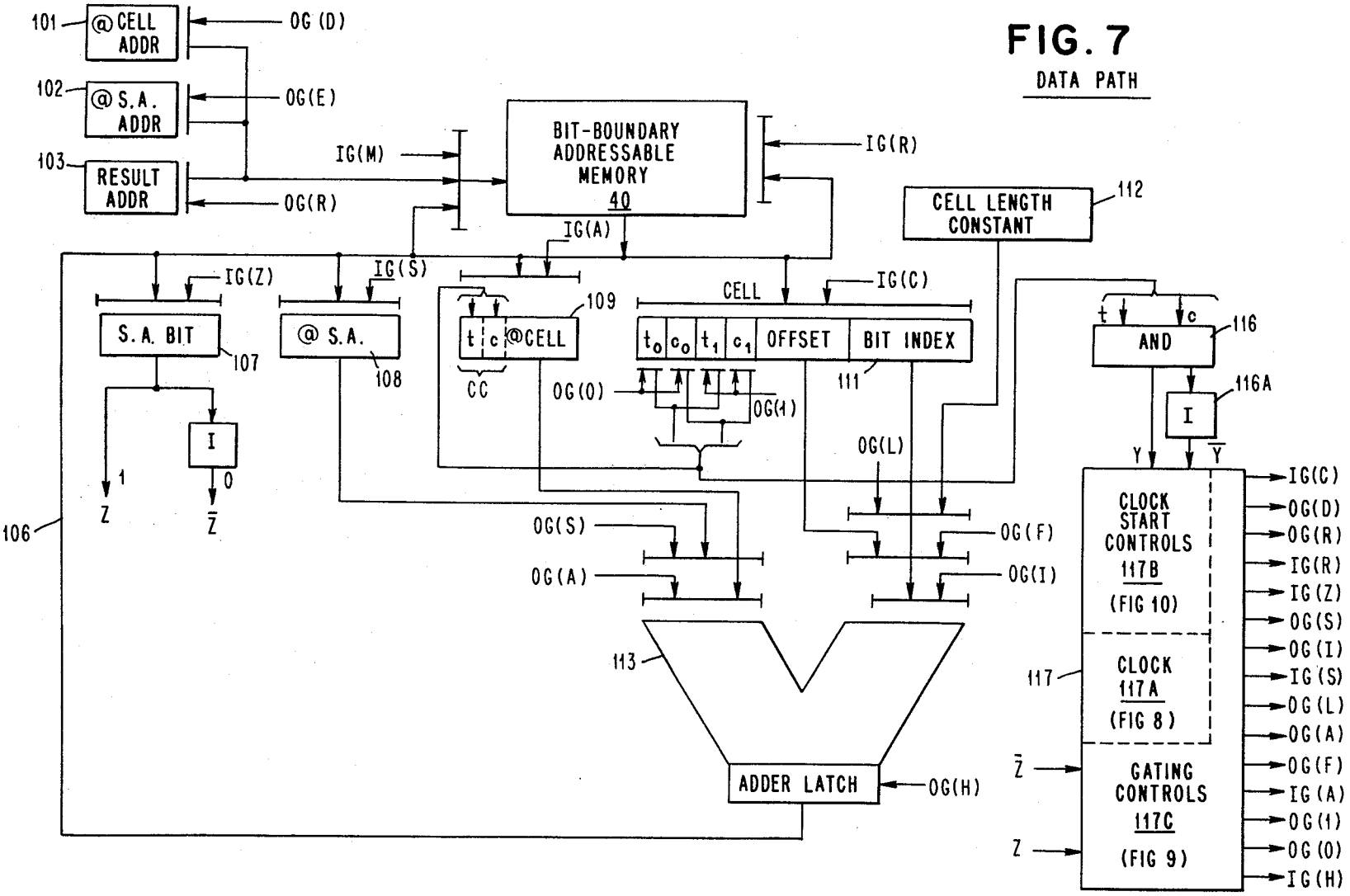

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 7

T948,010

DIRECTORY INSERTION AND DELETION METHOD AND MEANS

Luther J. Woodrum, Poughkeepsie, N.Y., assignor to International Business Machines Corporation, Armonk, N.Y.

Continuation of application Ser. No. 411,545, Oct. 31, 1973, which is a continuation of application Ser. No. 136,951, Apr. 23, 1971. This application Apr. 10, 1975, Ser. No. 566,892

**Int. Cl. G06f *7/00***

U.S. Cl. 444—1

27 Sheets Drawing. 187 Pages of Specification

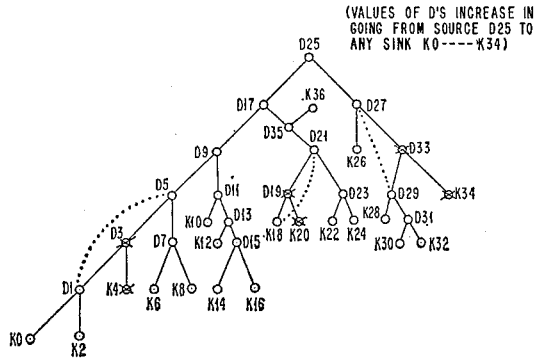

An electrical method for generating and maintaining an electrical directory entity in a data processing machine. The directory may be used to automatically locate objects in the computer system, e.g. in main store or on I/O devices. The objects are represented by electrical identifier signals received as input to the method. Electrical signals are generated comprising connected inner vertices and sinks. The signals comprising each inner vertex from a bit-index field, a flag field, and a connecting edge field. The inner vertices are connected in ascending order along a path in the tree structure by the electrical signals forming the edge fields of the inner vertices in the connected paths. The physical configurations of the electrical identifier signals are used as search arguments for insertions or deletion in a connected path when it is traced. The physical layout of the vertices permits total flexibility by allowing each next vertex in a connected path to be physically located anywhere in the directory entity. Each vertex other than the source is located in one of a pair of cells. Each edge field connects its vertex to two other vertices in a pair of cells. The edge fields may be in absolute, offset, or invertible form, each form having different advantages when using the invention, e.g. the invertible edge permits backward tracing along a connected path.

INVENTOR
LUTHER J. WOODRUM

BY Bernard M. Goldman

ATTORNEY

FIG. 2A INSERTION

INSERTION WITH ABSOLUTE EDGE REPRESENTATIONS

FIG. 3A DELETION

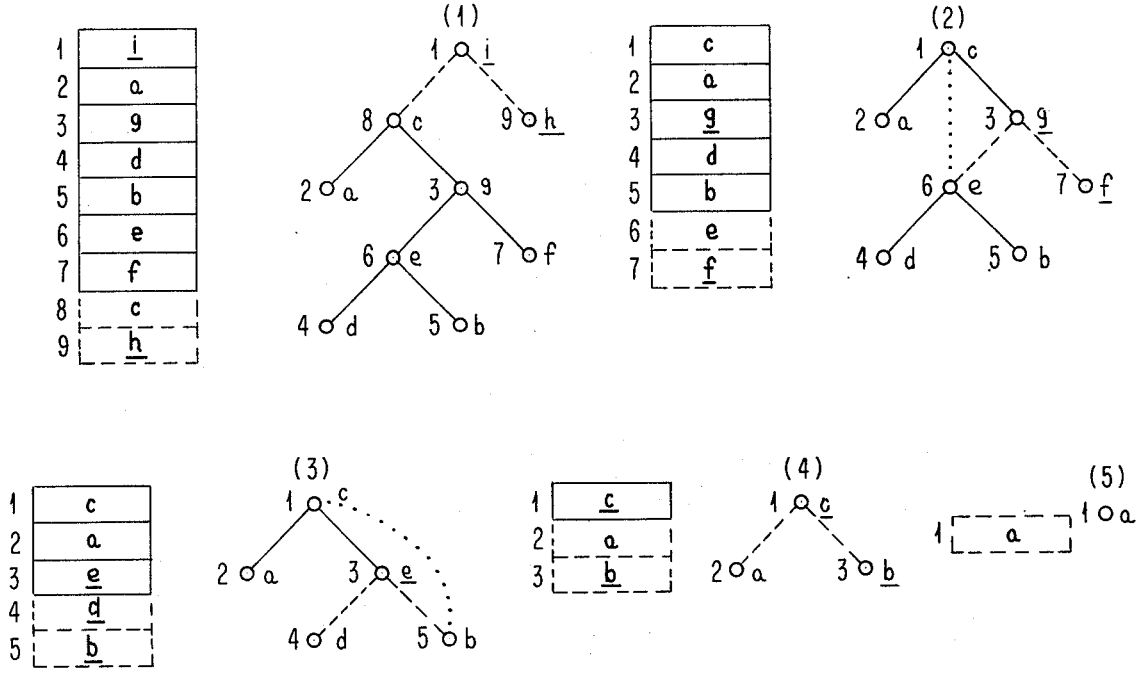

LEGEND

- o VERTEX
- o——o PRIOR INSERTED EDGE BETWEEN PRIOR VERTICES.
- o- - -o DELETED EDGE TO A SUCCESSOR
- o·····o EDGE TO NEW SUCCESSOR.
- C UNDERLINE INDICATES VERTEX TO BE DELETED.
- C NO UNDERLINE INDICATES VERTEX TO REMAIN AFTER DELETION.
- [ - - - ] DELETED ENTRY FROM DIRECTORY.
- [ ] REMAINING ENTRY IN DIRECTORY.
- i, h, g, f, ETC. REPRESENT ORDER OF DELETION.
- 1, 2, 3, ETC. ARE INDICES OF DIRECTORY ROWS REPRESENTING THE VERTICES.

ALTERNATE TO FIG 3B-1 FOR UPDATING PREDECESSOR FLAG FIELD.

FIG. 3C

FIELDS / REGISTERS

| | |
|---|---|
| @ Z | ADDRESS OF DIRECTORY SOURCE VERTEX |
| @ A | ADDRESS OF SEARCH ARGUMENT |
| D | NEW D-INDEX |
| BT OR PVB | PATH VECTOR BIT |
| ADR | SEARCH PATH SINK |
| LFR | LEFT OR RIGHT SR FLAG BIT |
| TMP | TEMPORARY REGISTER |
| P | PREDECESSOR INDEX |
| C | CURRENT VERTEX INDEX |
| S | SUCCESSOR INDEX |
| CC | CONDITION CODE |

FIG. 3E

INSERTION EXAMPLE

| | | |
|---|---|---|
| 0 | 15 | F34 |
| 19 | D35 | F20 |
| 20 | D21 | F22 |
| 21 | @K36 | |

AVAILABLE SPACE CHAINING

FIG. 4A
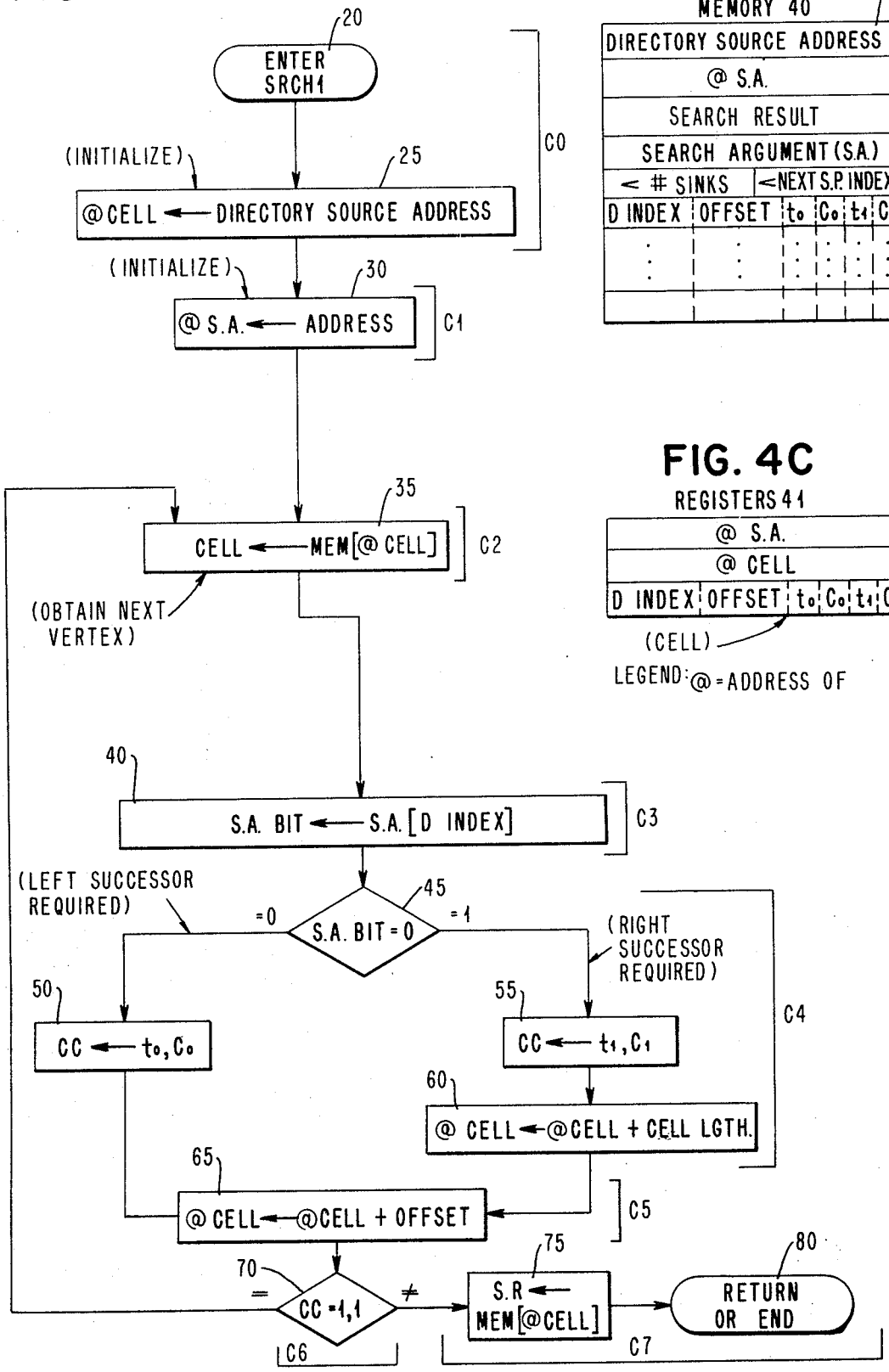
FIG. 4B
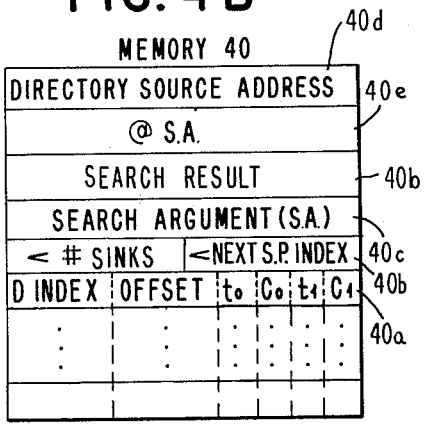
FIG. 4C (SRCH3)

INVERTIBLE EDGE REPRESENTATION OF BINARY TREE

Figure 8:
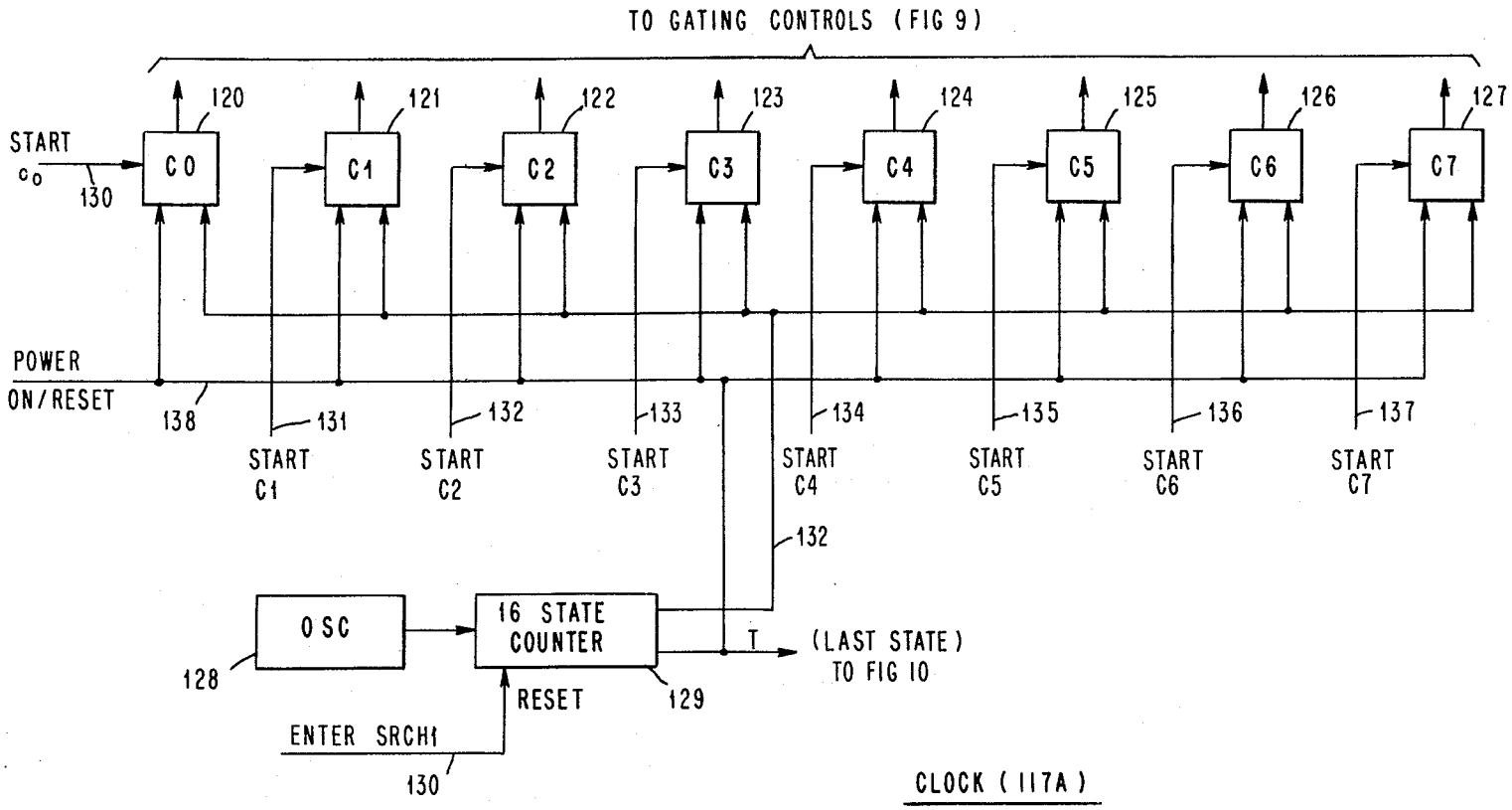
Figure 9:
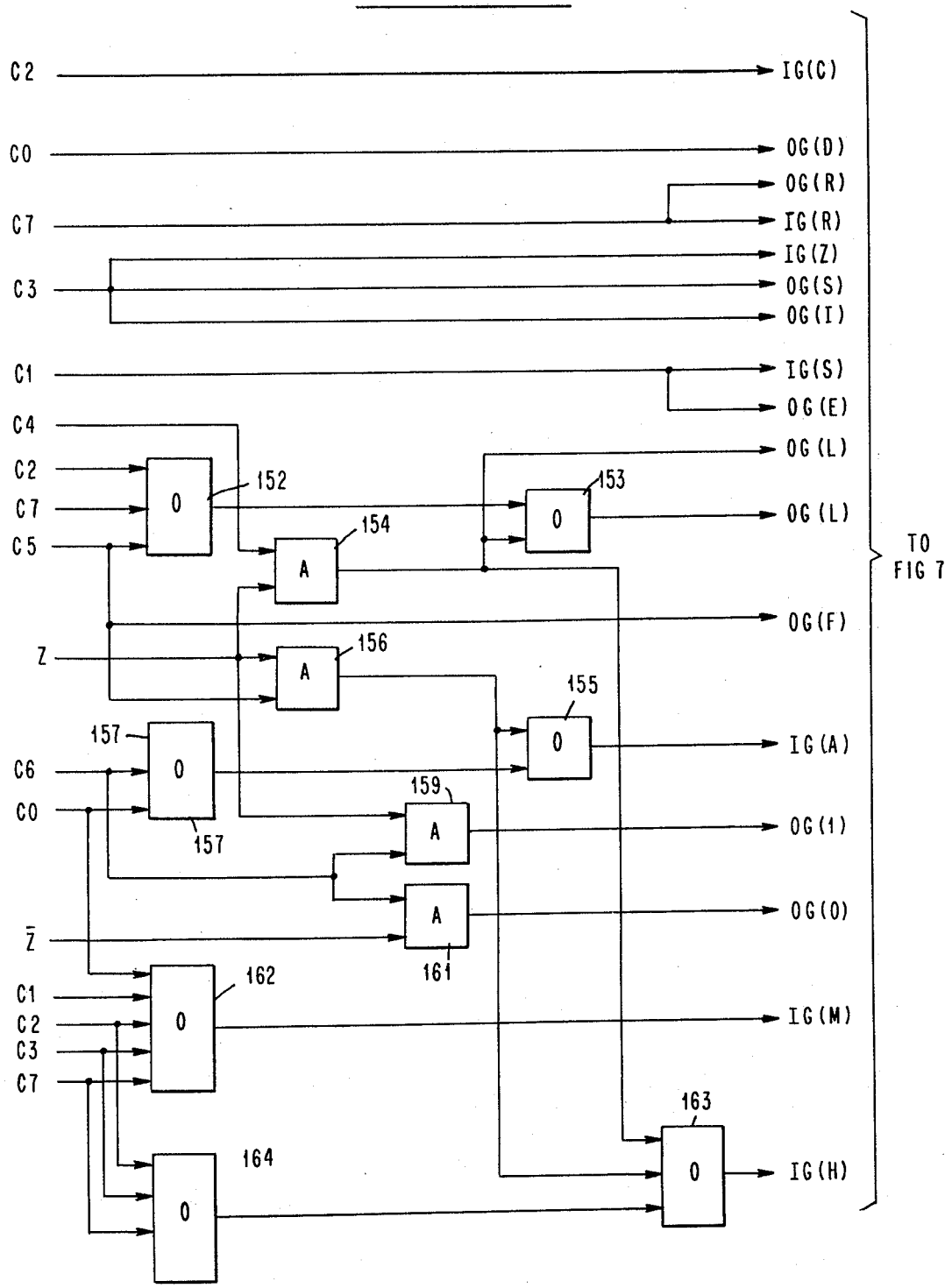
Figure 10:
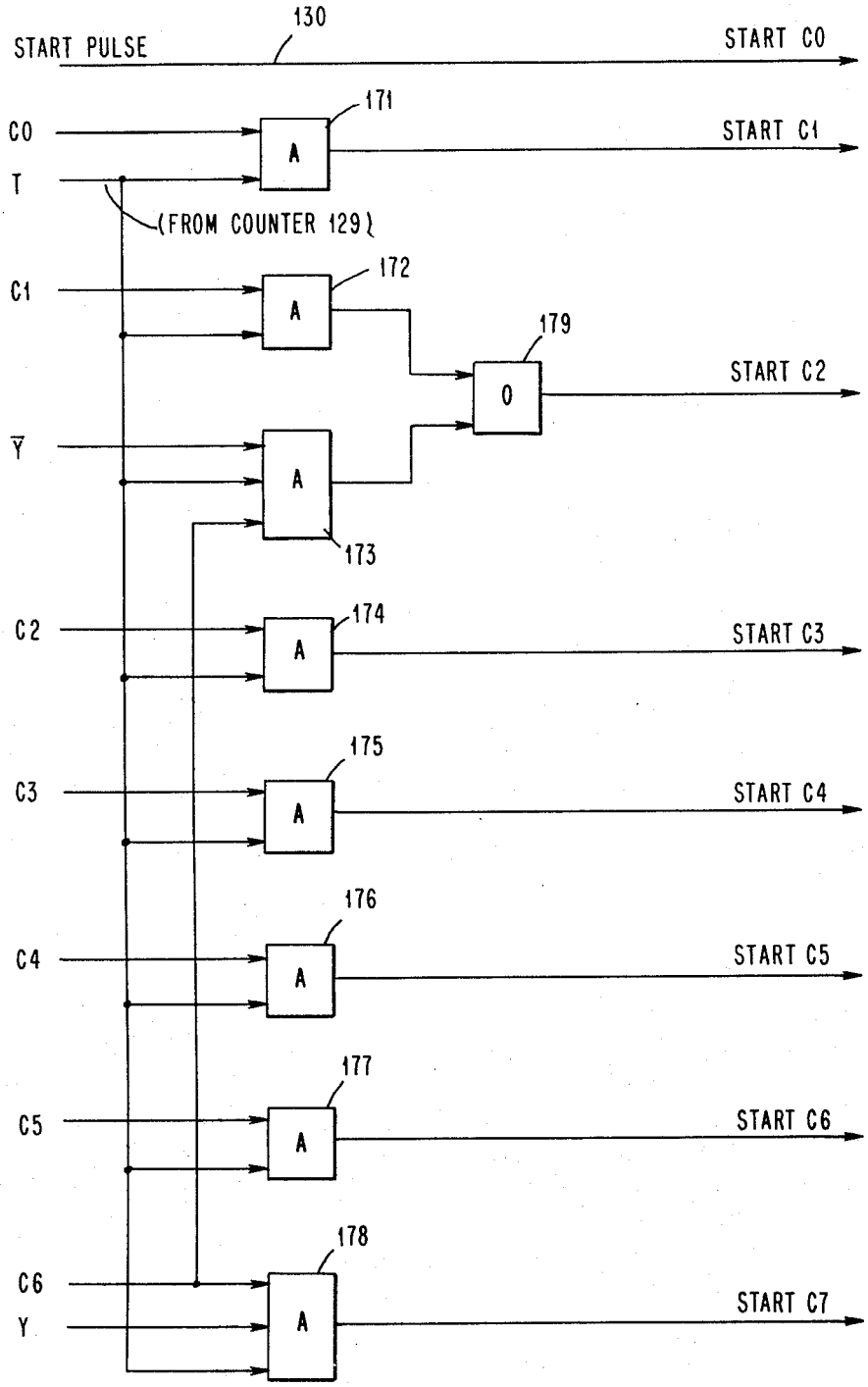
Figure 11A:
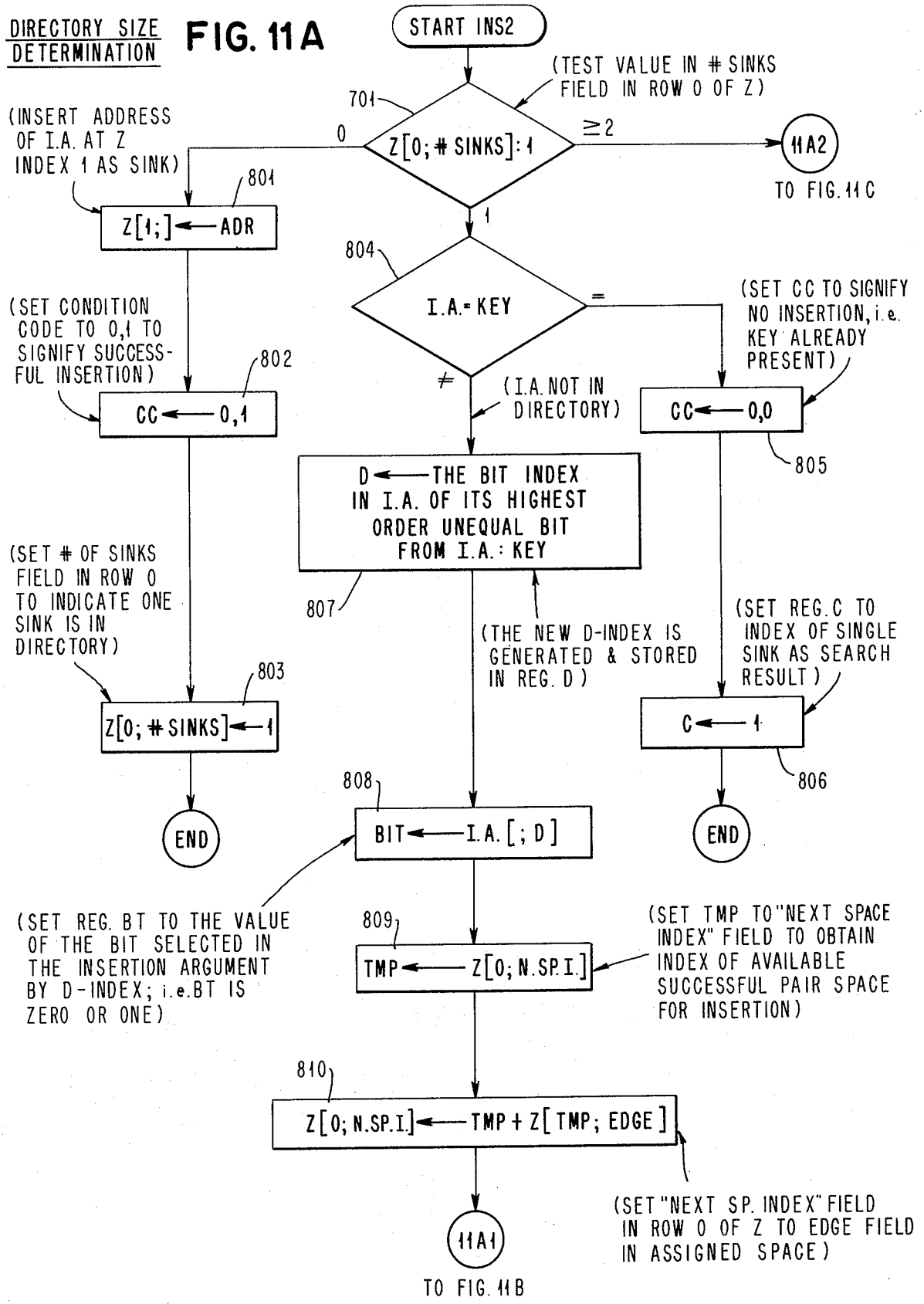
Figure 11B:
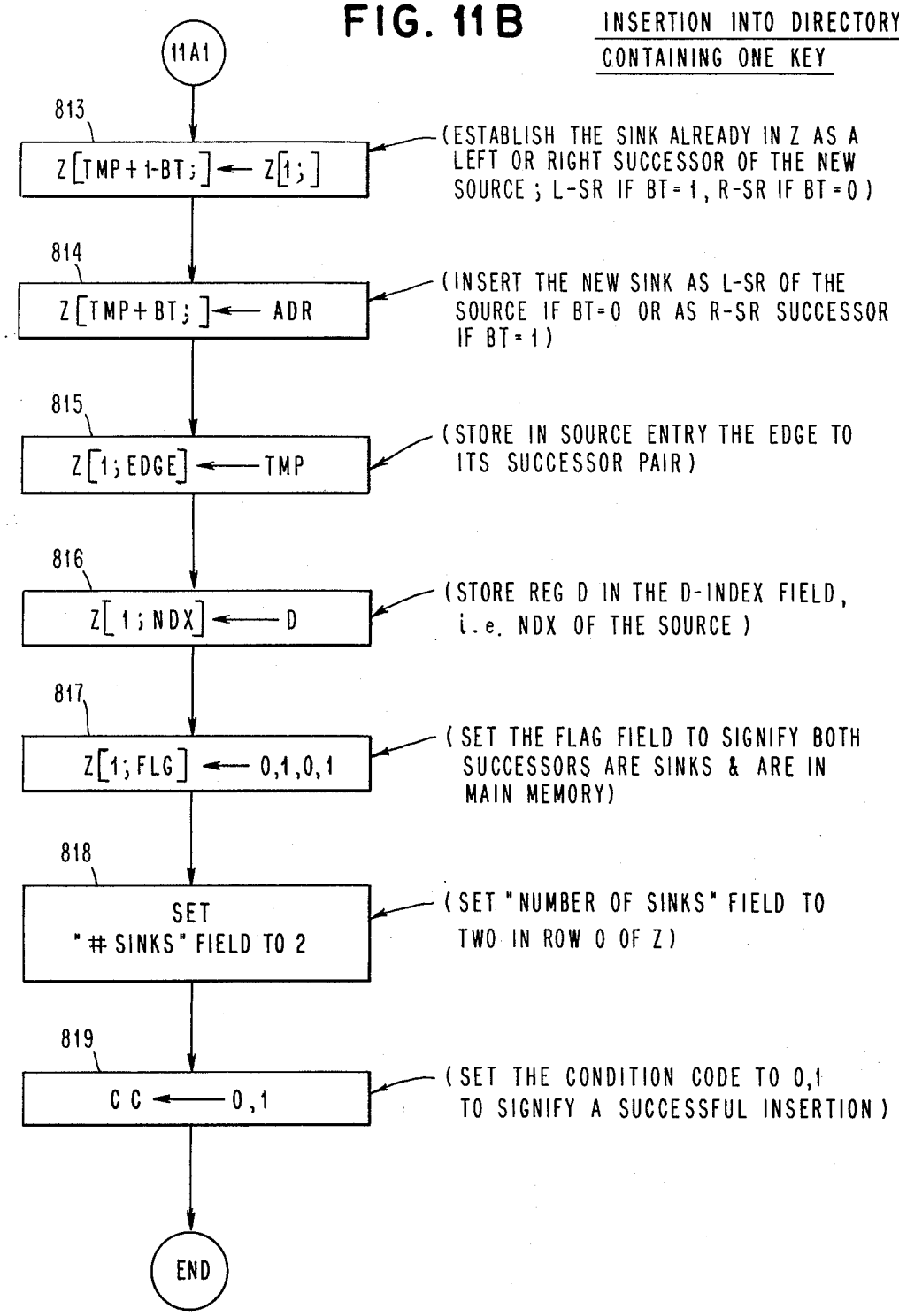
Figure 11C:
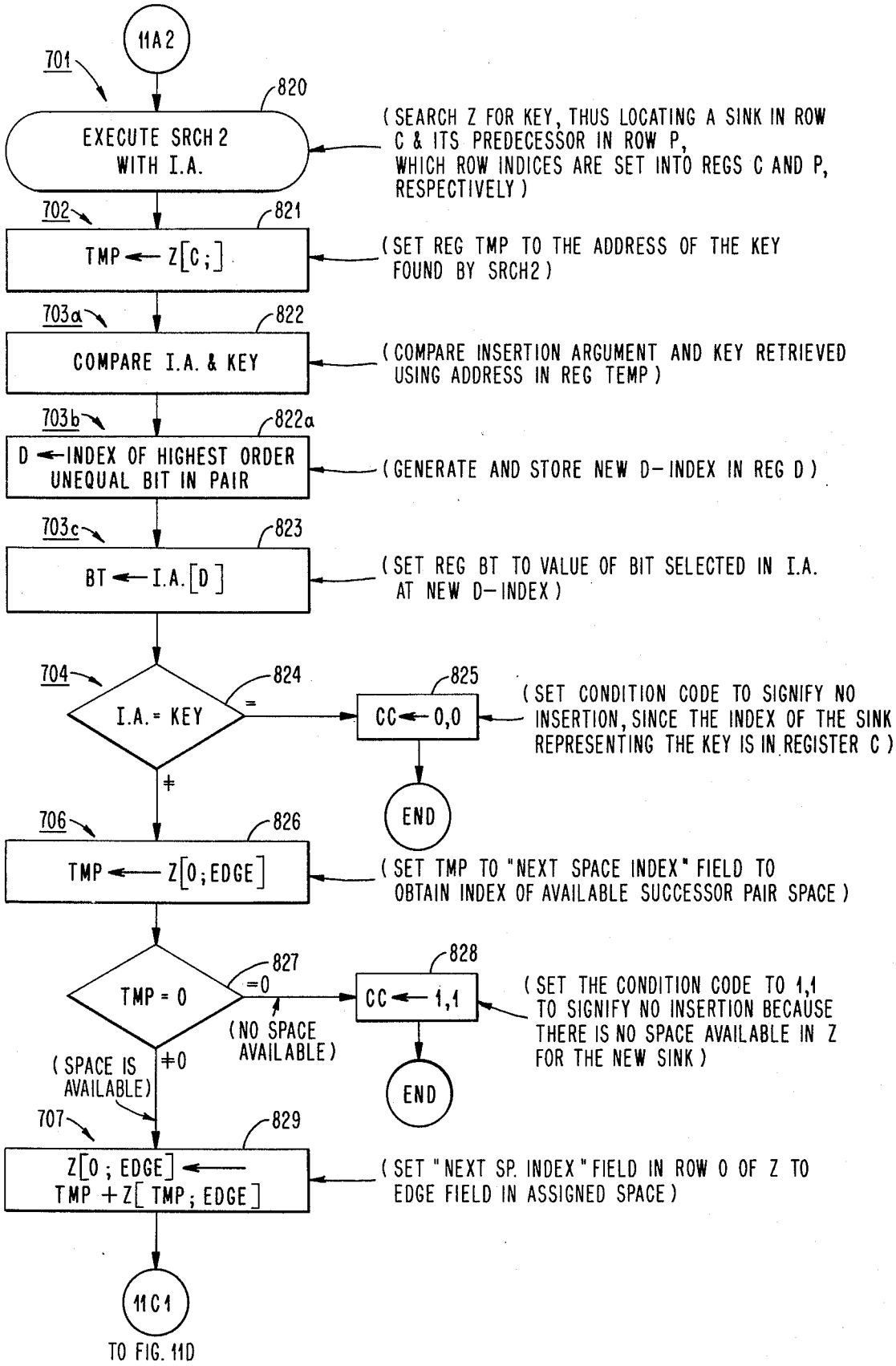
Figure 11D:
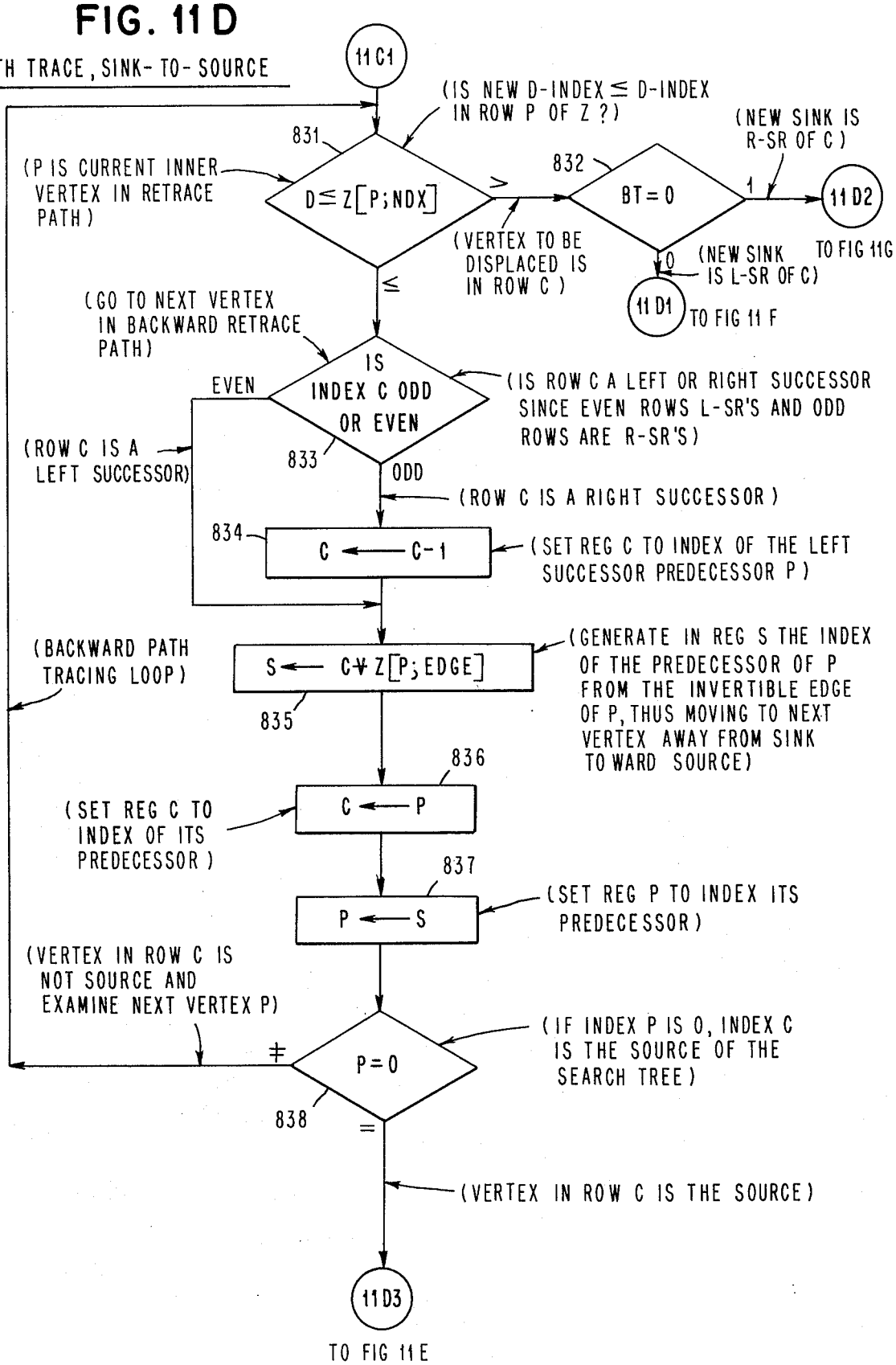
Figure 11E:
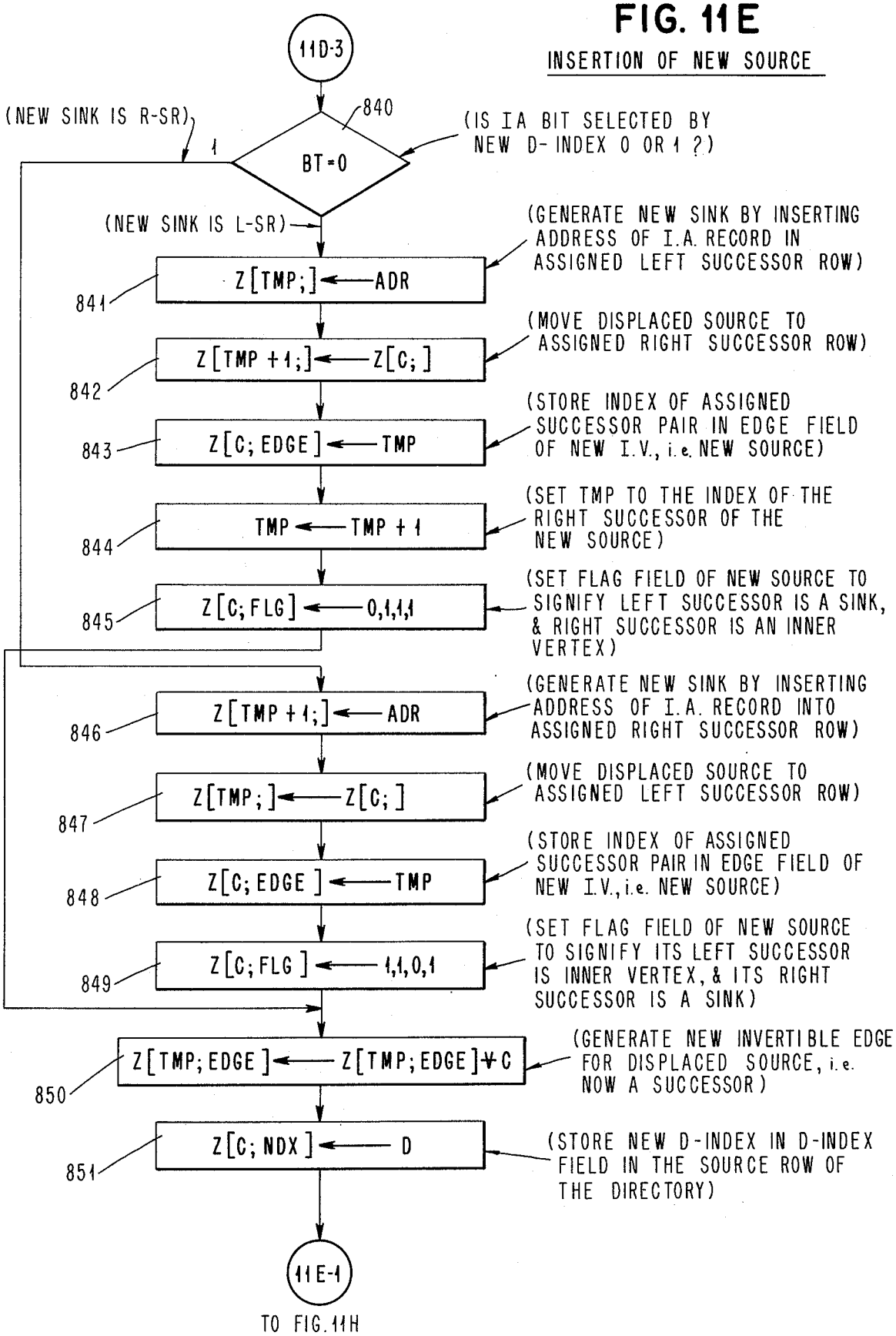
Figure 11F:
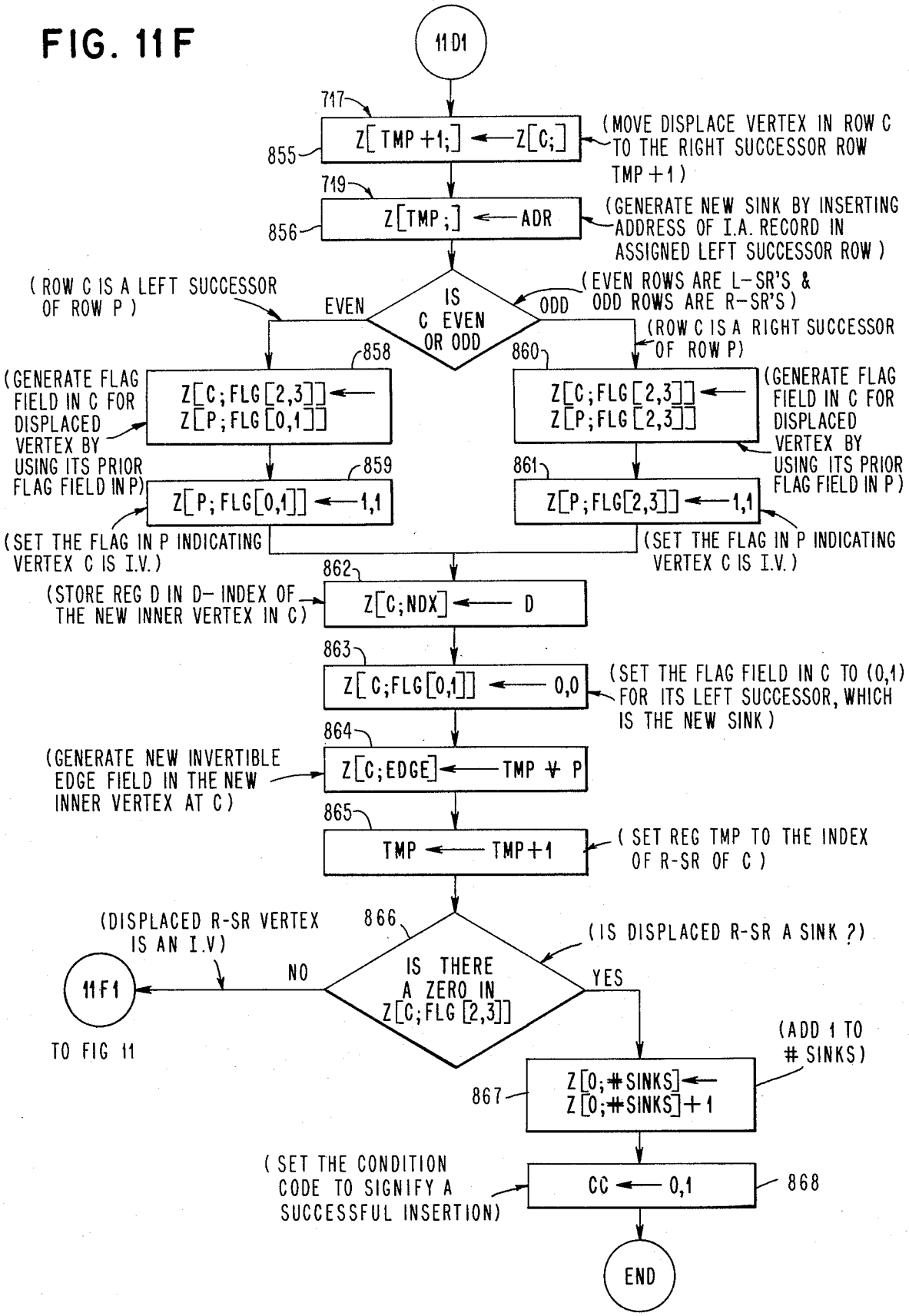
Figure 11G:
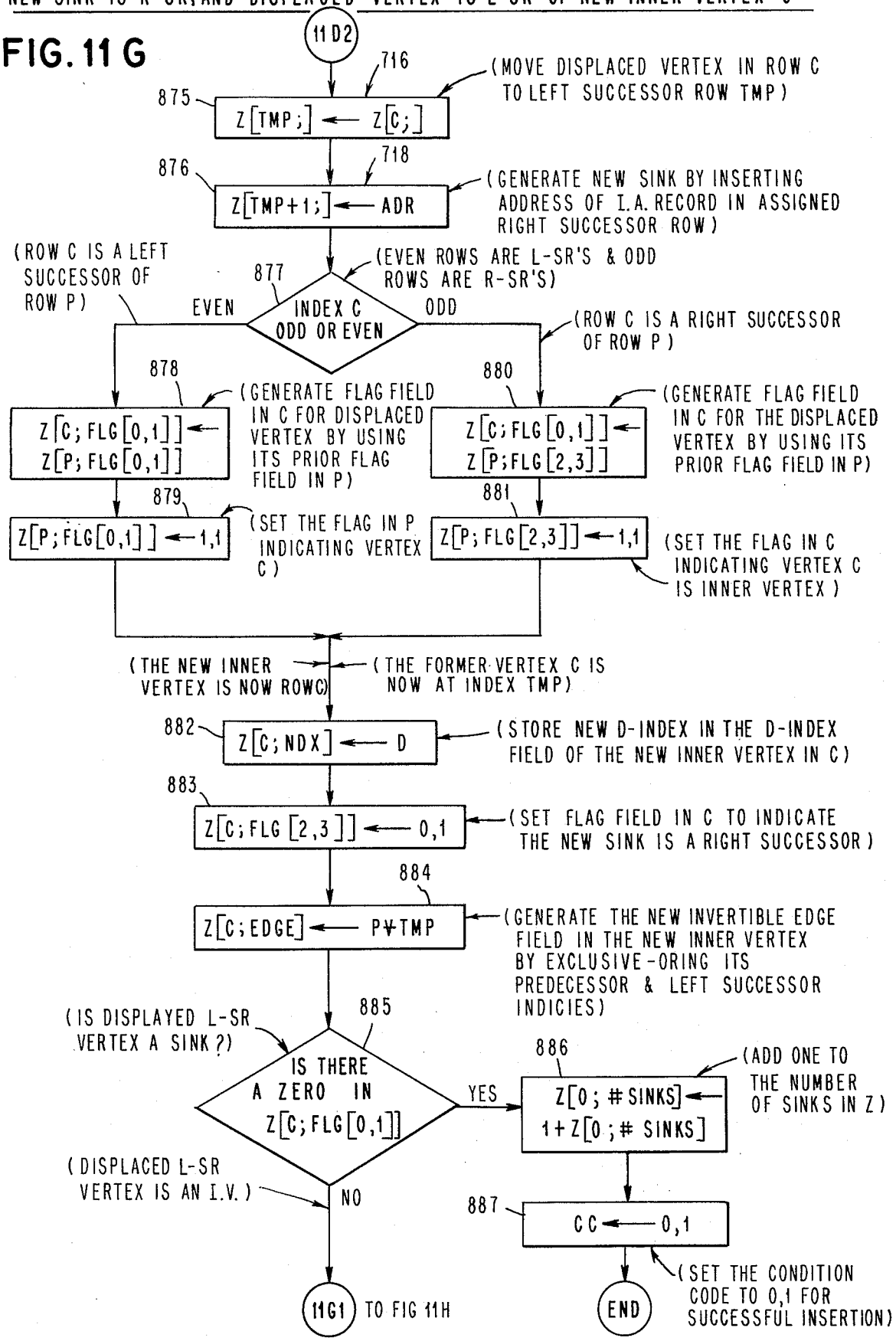
Figure 11H:
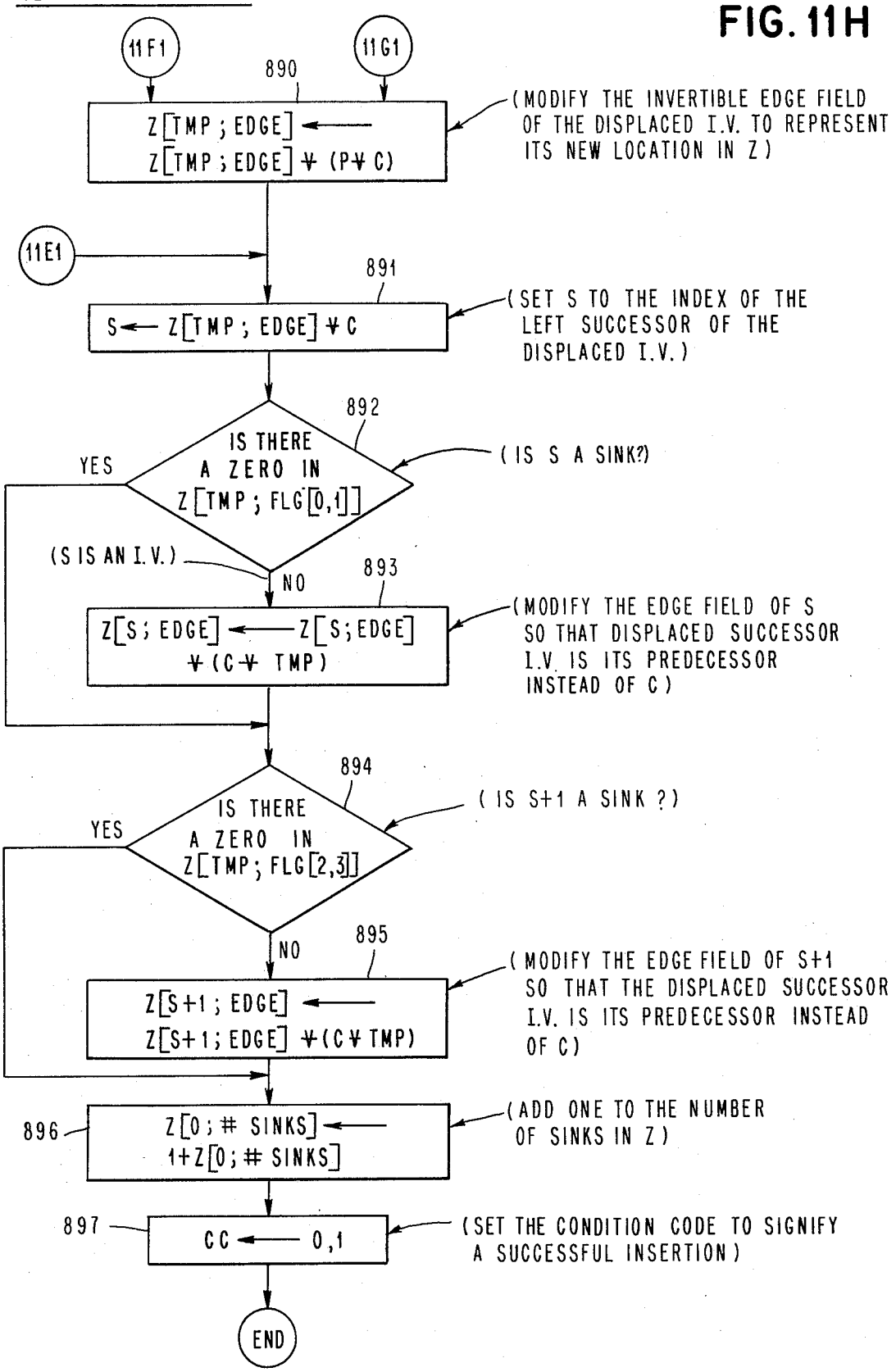
Figure 12A:
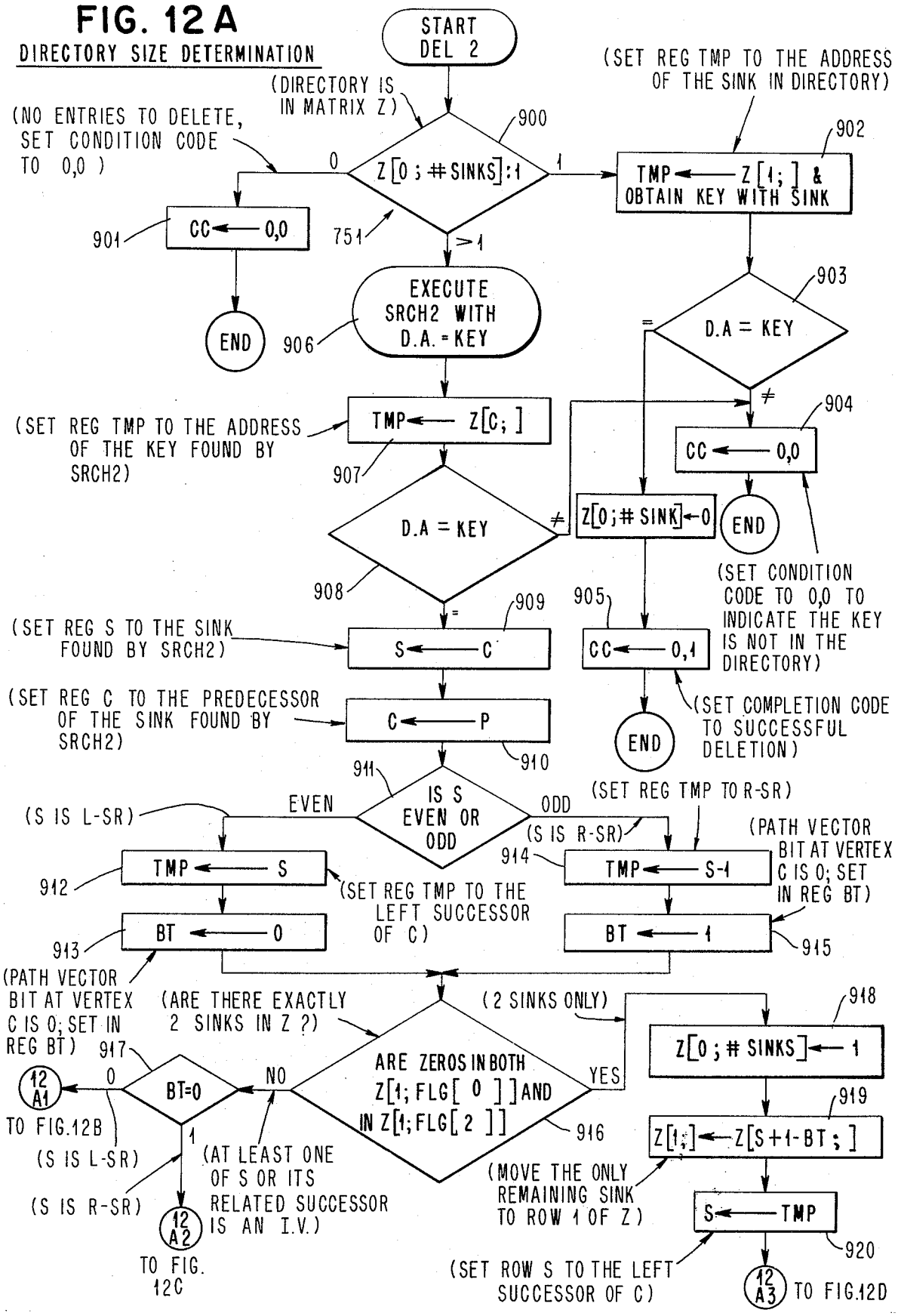
Figure 12B:
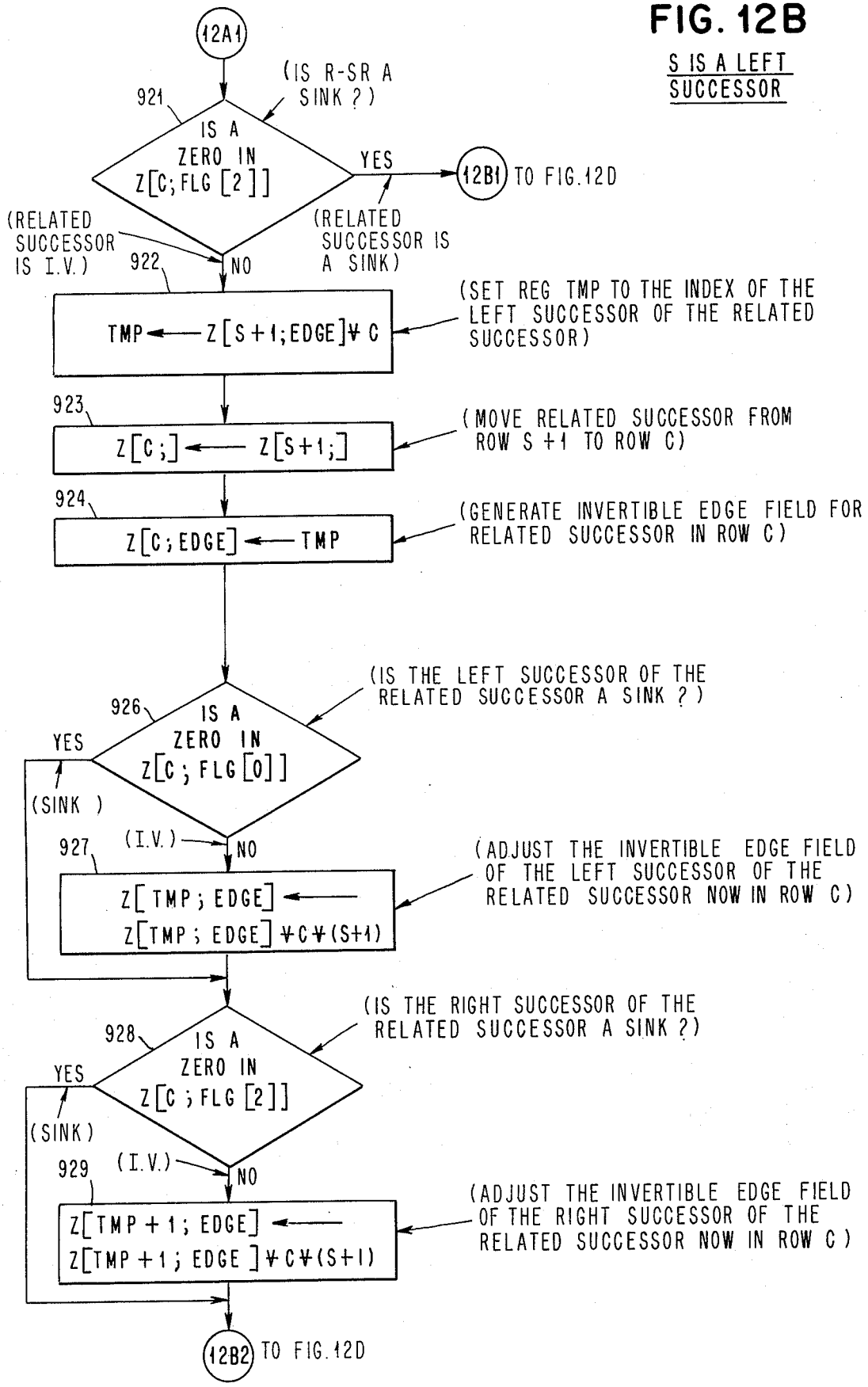
Figure 12C:
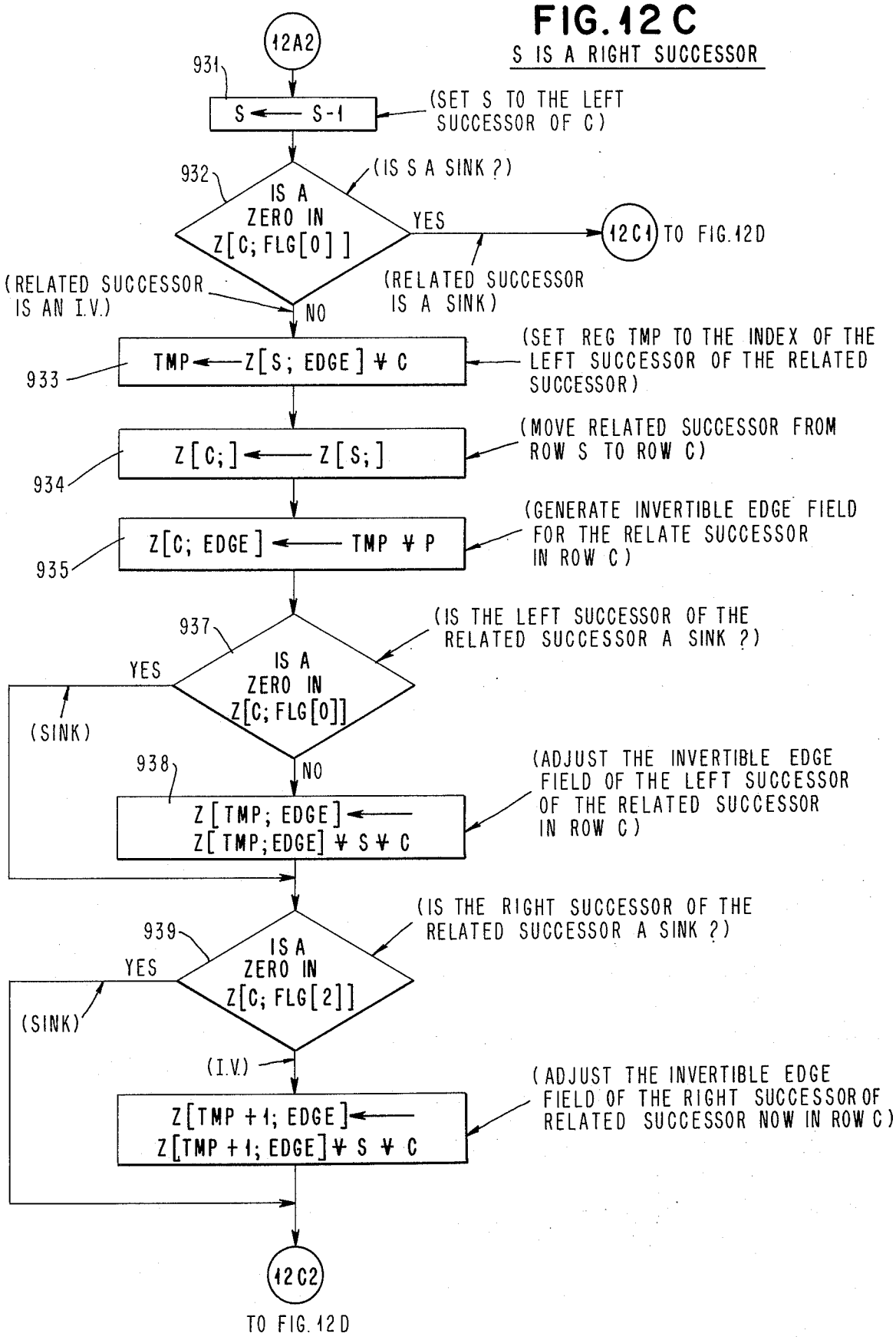
Figure 12D:
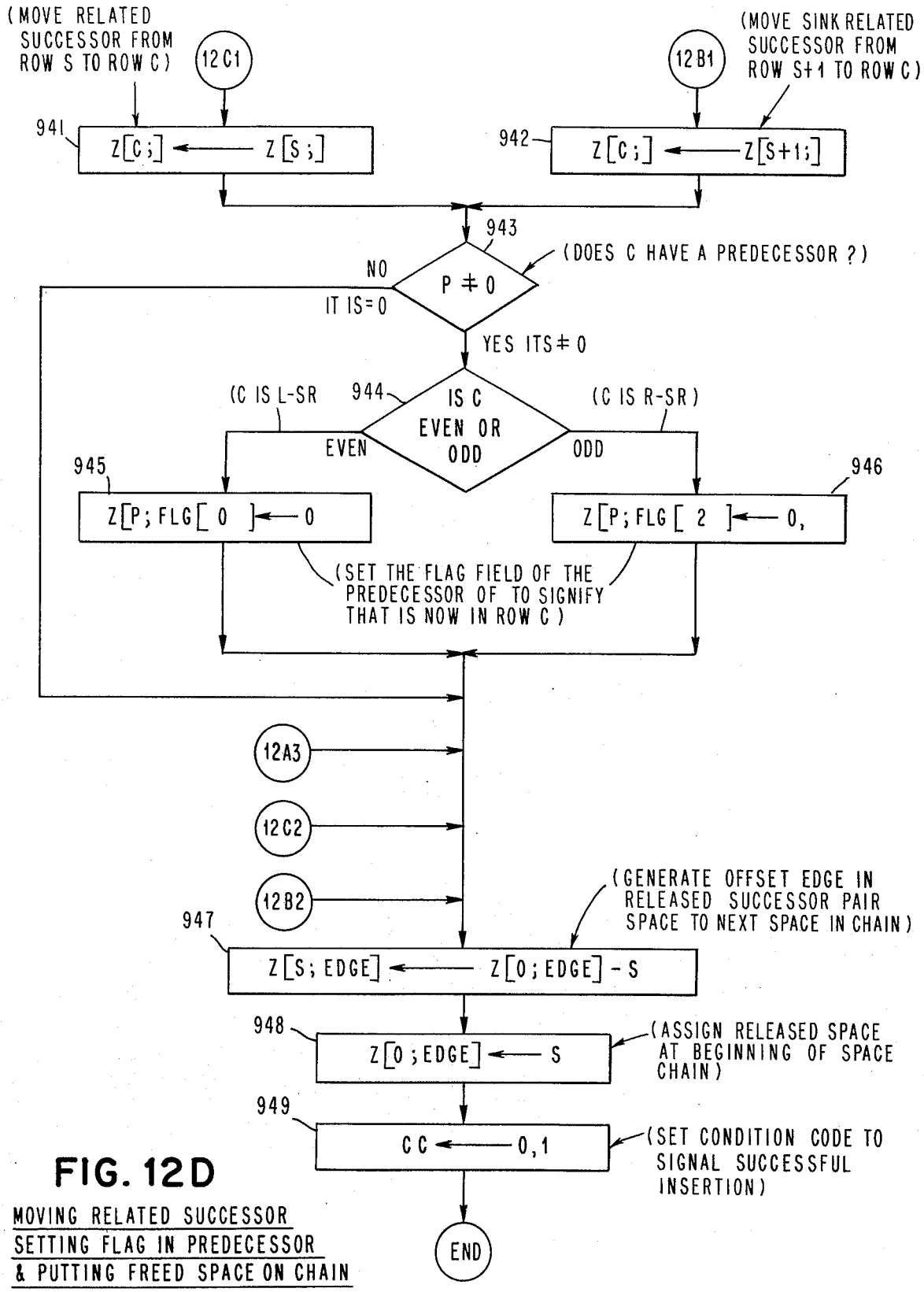

DATA PATH
@CELL ADDR
@S.A. ADDR
RESULT ADDR
BIT-BOUNDARY ADDRESSABLE MEMORY 40
CELL LENGTH CONSTANT
AND
CLOCK START CONTROLS 117B (FIG 10)
CLOCK 117A (FIG 8)
GATING CONTROLS 117C (FIG 9)
BIT INDEX
OFFSET
@CELL
@S.A.
S.A. BIT
ADDER LATCH
IG(R)
IG(M)
IG(A)
IG(C)
IG(S)
IG(Z)
OG(D)
OG(E)
OG(R)
OG(L)
OG(F)
OG(I)
OG(H)
OG(1)
OG(0)
OG(S)
OG(A)
IG(C)
OG(D)
OG(R)
IG(R)
IG(Z)
OG(S)
OG(I)
IG(S)
OG(L)
OG(A)
OG(F)
IG(A)
OG(1)
OG(0)
IG(H)
101
102
103
106
107
108
109
111
112
113
116
116A
117

GATING CONTROLS

CLOCK STARTING CONTROLS

DIRECTORY SIZE DETERMINATION

INSERTION INTO DIRECTORY CONTAINING ONE KEY

PATH TRACE, SINK-TO-SOURCE

INSERTION OF NEW SOURCE

NEW SINK IS L-SR AND DISPLACED VERTEX IS R-SR OF NEW INNER VERTEX C

NEW SINK IS R-SR, AND DISPLACED VERTEX IS L-SR OF NEW INNER VERTEX C

GENERATE INVERTIBLE EDGE FIELDS IN DISPLACED INNER VERTEX AND IN ITS INNER VERTEX SUCCESSORS

DIRECTORY SIZE DETERMINATION

S IS A LEFT SUCCESSOR

S IS A RIGHT SUCCESSOR

MOVING RELATED SUCCESSOR
SETTING FLAG IN PREDECESSOR
& PUTTING FREED SPACE ON CHAIN